M. SWEET.

CURRY-COMBS.

No. 7,821. Reissued July 31, 1877.

Witnesses:

S. J. Masson

D. P. Cowl

Inventor

Miles Sweet by E. E. Masson atty.

N. PETERS, PHOTO-LITHOGRAPHER, WASHINGTON, D. C.

UNITED STATES PATENT OFFICE.

MILES SWEET, OF TROY, NEW YORK.

IMPROVEMENT IN CURRY-COMBS.

Specification forming part of Letters Patent No. 89,182, dated April 20, 1869; Reissue No. 7,821, dated July 31, 1877; application filed June 11, 1877.

DIVISION B.

*To all whom it may concern:*

Be it known that I, MILES SWEET, of Troy, in the county of Rensselaer and State of New York, have invented certain new and useful Improvements in the Construction of Curry-Combs; and that the following is a full, clear, and exact description of the same, reference being had to the accompanying drawings, making a part of this specification, in which—

Figure 1:
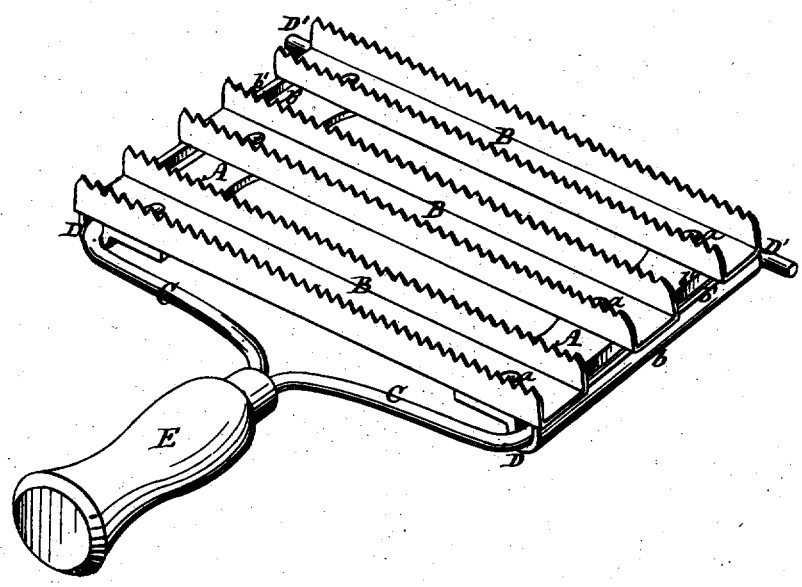
Figure 2:
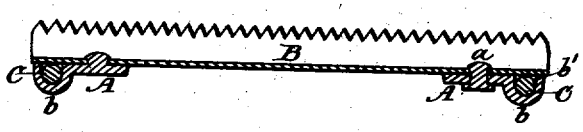

Figure 1 represents, in perspective, the face of a curry-comb having my improvements. Fig. 2 represents a vertical section of the same.

Similar letters of reference denote like parts in both figures.

My invention consists in my peculiar manner or method of attaching or securing a series or set of comb-bars to the shank-frame of curry-combs by transverse connecting end bars, or by end pieces formed of malleable or wrought metal, provided with lugs or loops, forming a trough or grooves, U-shaped, of such size as to receive the shank-frame, both edges of the trough being in the same plane with the back of the comb, so that, after a set of comb-bars have had their respective ends riveted to the end bars, the shank-frame is found to be securely connected to the comb-bars without requiring any additional clinching of the lugs or trough around the shank-frame, the latter being simply bent where it enters and leaves the body of the curry-comb.

In the drawings, each end bar A is extending nearly the whole width of the comb, forming a rib or loop, *b*, across the top and near the ends, that adds materially to the strength and stiffness of the frame, while both edges of the groove formed upon the end pieces at *b'* are in the same plane as the face of the piece A, allowing the shank-frame C of the handle E to be placed within the groove, and retained securely in connection with the body of the comb by the comb-bars lapping over the edge *b'* of the groove, and without closing or hammering the edge *b'* of the loop *b* of the connecting-pieces, but by simply riveting in the usual way, at *a*, the frame A to the comb-bars.

It is evident that the shank-frame C may be placed within the groove or grooves formed for its reception nearly as conveniently after as before the piece A is riveted to the comb-bars, and then simply bent at D and D', where it issues from the body of the comb, to retain the shank-frame C securely connected to the comb.

Having thus described my invention, I claim—

1. The troughed plates A, and their combination with the comb bars and handle, as described, in virtue of which the comb-bars extend across and over the trough, and thus secure the comb proper to the wire frame of the handle, substantially as set forth.

2. The combination of the toothed bars, the rods or wires connecting the bars and handle, and plates cast with concave loops, by which the rods are connected to the bars, substantially as set forth.

MILES SWEET.

Witnesses:

ALVAH TRAVER,
J. W. PALMER.